United States Patent
Karlov et al.

(10) Patent No.: US 8,332,492 B2
(45) Date of Patent: *Dec. 11, 2012

(54) SYSTEM AND METHOD FOR COMPUTER NETWORK CONFIGURATION AND OPERATION

(75) Inventors: Yury Karlov, Taganrog (RU); Nikolay Kovach, Taganrog (RU)

(73) Assignee: nComputing Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/018,575

(22) Filed: Feb. 1, 2011

(65) Prior Publication Data

US 2011/0213864 A1    Sep. 1, 2011

Related U.S. Application Data

(63) Continuation of application No. 12/207,402, filed on Sep. 9, 2008, now Pat. No. 7,908,347.

(60) Provisional application No. 60/971,217, filed on Sep. 10, 2007.

(51) Int. Cl.
   *G06F 15/177* (2006.01)
(52) U.S. Cl. .......... 709/220; 709/203; 370/254
(58) Field of Classification Search ........... 709/203, 709/220, 221; 370/254
   See application file for complete search history.

(56) References Cited

U.S. PATENT DOCUMENTS

| | | | |
|---|---|---|---|
| 6,925,079 B2 | 8/2005 | Matsukawa | |
| 7,561,581 B2 | 7/2009 | Kim | |
| 2005/0114682 A1* | 5/2005 | Zimmer et al. | 713/187 |
| 2006/0165056 A1* | 7/2006 | Komaki | 370/352 |
| 2007/0169181 A1* | 7/2007 | Roskind | 726/5 |

OTHER PUBLICATIONS

"U.S. Appl. No. 12/207,042, Notice of Allowance mailed Nov. 16, 2010", 7 pgs.
"U.S. Appl. No. 12/207,402, Non-Final Office Action mailed May 24, 2010", 13 pages.
"U.S. Appl. No. 12/207,402, Response filed Aug. 20, 2010 to Non Final Office Action mailed May 24, 2010", 8 pgs.

* cited by examiner

*Primary Examiner* — Moustafa M Meky
*Assistant Examiner* — El Hadji Sall
(74) *Attorney, Agent, or Firm* — Schwegman Lundberg & Woessner, P.A.

(57) ABSTRACT

A system for simplifying the configuration and administration of computer networks. A the server system first sends a broadcast message out to the other network nodes on the computer network to learn configuration of each other network nodes on the local network. Next, network software within each other network node (not shown) responds to the broadcast message with a response containing configuration information and an identifier key value. In one embodiment, the identifier key value may be a randomly generated number. The server system then builds a table of network nodes using the information received in the response messages sent in response to the broadcast message. The server may then communicate with systems having duplicate addresses using the identifier key value. In some embodiments, the server system may send request messages to one or more network nodes specifying a network configuration change.

20 Claims, 8 Drawing Sheets

SYSTEM AND METHOD FOR COMPUTER NETWORK CONFIGURATION AND OPERATION

CROSS REFERENCE TO RELATED APPLICATIONS

This application is a continuation of and claims the benefit of priority under 35 U.S.C. §120 to U.S. patent application Ser. No. 12/207,402, entitled "SYSTEM AND METHOD FOR COMPUTER NETWORK CONFIGURATION AND OPERATION," filed on Sep. 9, 2008, and issued as U.S. Pat. No. 7,908,347 on Mar. 15, 2011, which claims the benefit of priority under 35 U.S.C. §119(e) to U.S. Provisional Patent Application Ser. No. 60/971,217, entitled "SYSTEM AND METHOD FOR COMPUTER NETWORK CONFIGURATION AND OPERATION," filed on Sep. 10, 2007, the benefit of priority of each of which is claimed hereby, and each of which are incorporated by reference herein in its entirety.

TECHNICAL FIELD

The present invention relates to the field of computer networking. In particular, but not by way of limitation, the present invention discloses techniques for configuring and deploying a computer network system in a manner that is very simple and very robust such that a novice can deploy the computer network system.

BACKGROUND

Individual computer systems are very useful tools for performing various computational tasks and solving problems. However, when a set of individual computer systems are networked together with a computer network, the utility of every computer system on the computer network is enhanced. For example, information may be shared among the different computer systems on the network, difficult computational tasks may be divided into smaller individual computational tasks that may then be distributed to all the individual computer systems on the computer network, data may be transmitted across vast distances, and the individual computer system may be used as telecommunication devices.

Computer networks were once the exclusive tools of universities, research facilities, and large businesses. However, computer networking is now available to nearly everyone with a personal computer system. Every modern cellular telephone is actually a computer system on a computer network. Low cost computer networking components and products have fueled an exponential growth of the world-wide internet that connects together millions of computer systems across the entire planet.

The deployment of local area networks (LANs) for computer systems and the coupling of a local network to the global internet were once very difficult and expensive tasks that were only available to large businesses and universities. However, simplified computer networking equipment now allow local schools and residences to connect to the internet in a relatively easy manner. But even with the current generation of simplified networking equipment, an inexperienced person attempting to deploy a local area network or connect a local area network to the global internet can make mistakes that cripple the network or render one or more devices on the network inoperative.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

Figure 1:
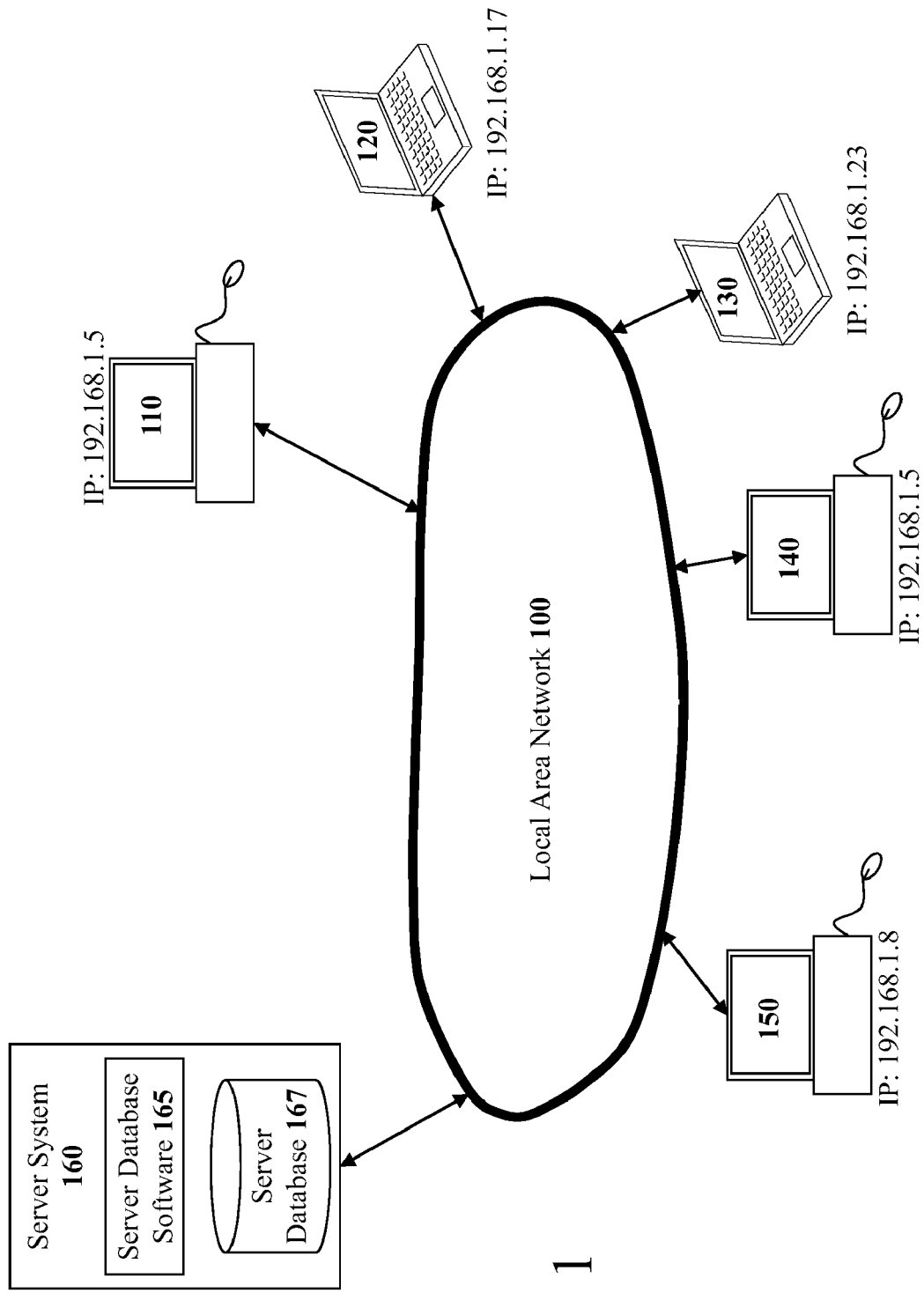
FIG. 1 illustrates a block diagram of a computer network system with a network misconfiguration.

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although the present invention is mainly disclosed with reference to the well-known Internet Protocol (IP), the teachings of the present invention can be used in other computer network protocols. The embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Existing Computer Networks

Most existing networked computer systems use the well-known Transport Control Protocol/Internet Protocol (TCP/IP) since that network protocol is the lingua franca of the global internet. With TCP/IP, each individual node on the computer network is assigned an Internet Protocol (IP) address that is a four byte value usually denoted with four numbers separated by dots such as 192.168.1.1. For a TCP/IP network to operate properly, each individual node on the same network should have a unique IP address such that each individual network node can be addressed individually. Note that different network nodes on different computer networks that are coupled by a router may have the same IP address since the router that couples the different computer networks will handle any needed address translations.

In the very early days of the internet, each individual network node coupled to the internet was assigned its own globally unique IP address. A network administrator would program an IP address into a network device and that network device would keep that IP address until it was explicitly changed by a network administrator. Since each individual network device received a globally unique IP address and kept that same IP address (perhaps until the network device was decommissioned) such manually assigned IP addresses are known as 'static IP addresses'.

As the internet began to grow, it became clear that there would not be enough unique IP addresses for every network node that people desired to connect to the internet. Furthermore, it had become clear that the administrative overhead of keeping track of every static IP address allocation became quite cumbersome. For example, network administrators had to keep track of which IP addresses have been assigned to which network nodes, which IP addresses have not yet been assigned, and which IP addresses have become available due to an original network device being decommissioned. If a network administrator made a mistake in assigning an IP address, a user changed his own static IP address, or a second administrator simultaneously assigned the same IP address to another network device, then more than one network nodes could end up with the same static IP address. Such a network configuration may cause the network to fail to operate properly.

FIG. 1 illustrates a block diagram of a computer network system with such a network misconfiguration. Specifically, both computer system 110 and computer system 140 have been assigned the same IP address of 192.168.1.5. In such a misconfigured computer network, any message sent to the IP address 192.168.1.5 will be processed by both computer system 110 and computer system 140 even though the message was probably intended to be processed by only one of the two systems. Similarly, a message sent from either computer system 110 or computer system 140 would may appear to be sent by the other system with the same IP address.

To address some of these network configuration problems, the Dynamic Host Configuration Protocol (DHCP) was introduced. Dynamic Host Configuration Protocol (DHCP) is a set of rules used by IP network devices such as computers, routers, and network adapters to allow the IP network device to request and obtain a unique IP address from a Dynamic Host Configuration Protocol (DHCP) server that has a pool of unique IP addresses available for assignment. (Note this IP addresses may be unique only on the local network, other network devices on other networks may have the same IP address.) In addition to obtaining an IP address, a DHCP client device may receive other additional IP network parameters such as the IP address of a default gateway, the subnet mask, and the IP addresses of Domain Name Service (DNS) servers that may be used to resolve domain name addresses. By using an authorized DHCP server to assign IP addresses to network nodes on a local network, the DHCP server can ensure that all of the IP addresses handed out are unique. The DHCP server will ensure that no IP address will be assigned to a second network device while a first assignment of that IP address to a first network device is still valid. In this manner, IP address management is automated and handled by a DHCP server such that no human network administrator is needed for allocating IP addresses to network devices on a network.

The Dynamic Host Configuration Protocol (DHCP) has simplified the configuration and deployment of computer networks. It is now a standard feature in most home network and small office network products. Specifically, most home network routers are pre-configured to be a DHCP server and most home network devices (such as personal computers, print servers, network attached storage devices, etc.) are pre-configure However, even with the Dynamic Host Configuration Protocol (DHCP) there are many network configuration problems that may occur. The DHCP server software may have a bug that causes it to assign the same address to multiple systems. More than one DHCP server may accidentally be placed on the same network such that both DHCP servers hand out IP addresses. If the two DHCP servers are using overlapping pools of IP addresses, then the same IP address may be assigned to more than one network device. Furthermore, a defective network device that has been dynamically assigned a DHCP IP address may continue to use an assigned DHCP IP address after the expiration period for that DHCP address even though a DHCP server may assign the same IP address to another network device. Thus, the network misconfiguration illustrated in FIG. 1 may still occur even in a computer network that uses DHCP in attempts to prevent such misconfigurations.

To avoid the problems of duplicate IP addresses, some computer network software relies on a lower level addressing scheme known as Media Access Control (MAC) addresses. MAC addresses are administered by the Institute of Electrical and Electronics Engineers (IEEE) and every Ethernet network device is given its own universally unique MAC address. Thus, in theory, all MAC addresses are supposed to be unique. However, this is no longer always the case. Many Internet Service Providers (ISPs) may only recognize one specific MAC address for an ISP customer such that many systems have been constructed in a manner that they allow a user to emulate a particular MAC address in order to change the hardware that is directly connected to the ISP without having to contact the ISP. For example, a home router may emulate a MAC address on an external port coupled to an ISP such that a user with a personal computer connected directly to the ISP may replace that personal computer with a the router. Most current Ethernet hardware allows such MAC address changing such that one can no longer rely upon every device having a globally unique MAC address. For example, if a user incorrectly couples a router with a changed MAC address to a computer network, there may end up being more than one network device on the local network with the same MAC address.

Administrating A Network With Misconfigured Network Settings

As set forth in the preceding section, the configuration and deployment of a computer network is not a trivial task. If a network administrator is not careful, more than one network device may be given the same IP address and/or MAC address. This may occur even in computer networks that use the simplified system of Dynamic Host Configuration Protocol (DHCP). The following list contains some of the possible network misconfigurations that may occur within a network:

1) One or more network device has no IP address assigned.
2) More than one network device has the same IP address.
3) More than one network device has the same MAC address.
4) More than one network device has the same IP address and MAC address.

The system and method of the present disclosure has been designed in attempts to detect and handle these different network misconfigurations. The system of the present invention may be able to detect and rectify the network misconfiguration such that the network becomes properly configured and functions properly. Alternatively, if the system of the present disclosure is unable to correct the network misconfigurations, the system may be able to instead allow the network to operate properly despite the network misconfiguration.

Figure 2:
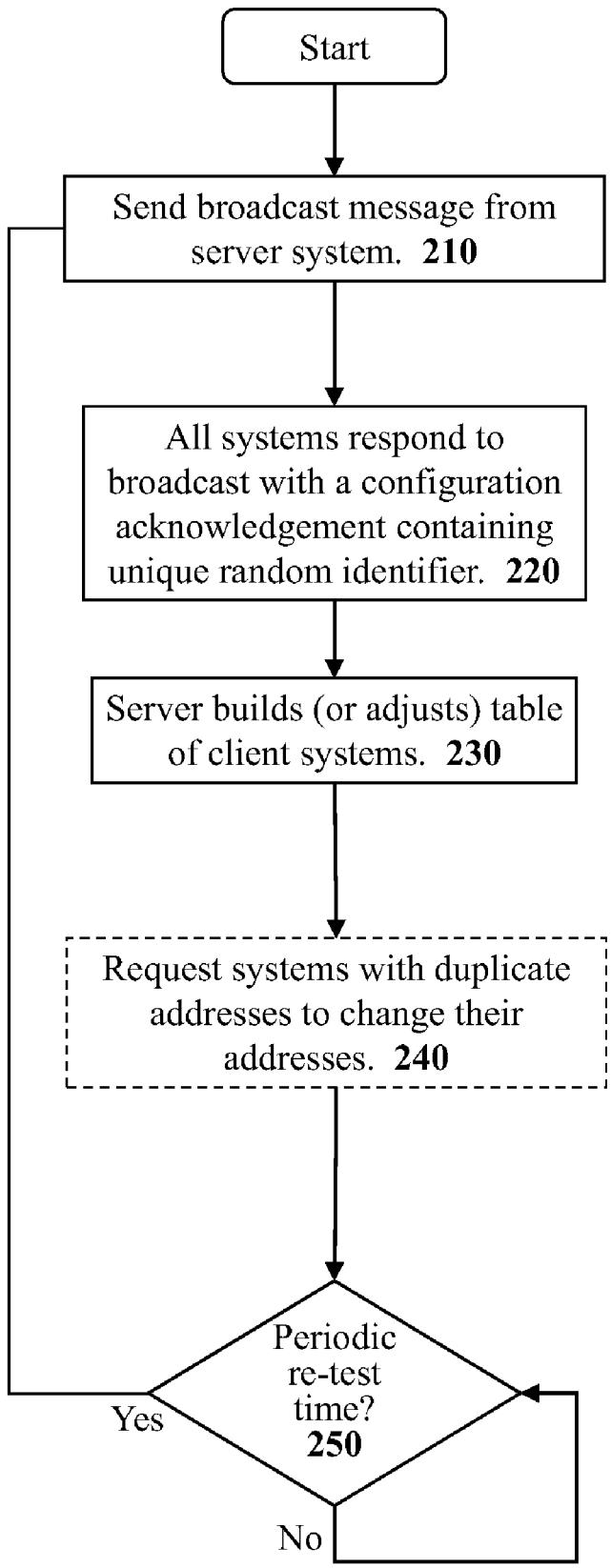
FIG. 2 illustrates a flow diagram of method for detecting and handling a misconfigured computer network system.
Figure 3A:
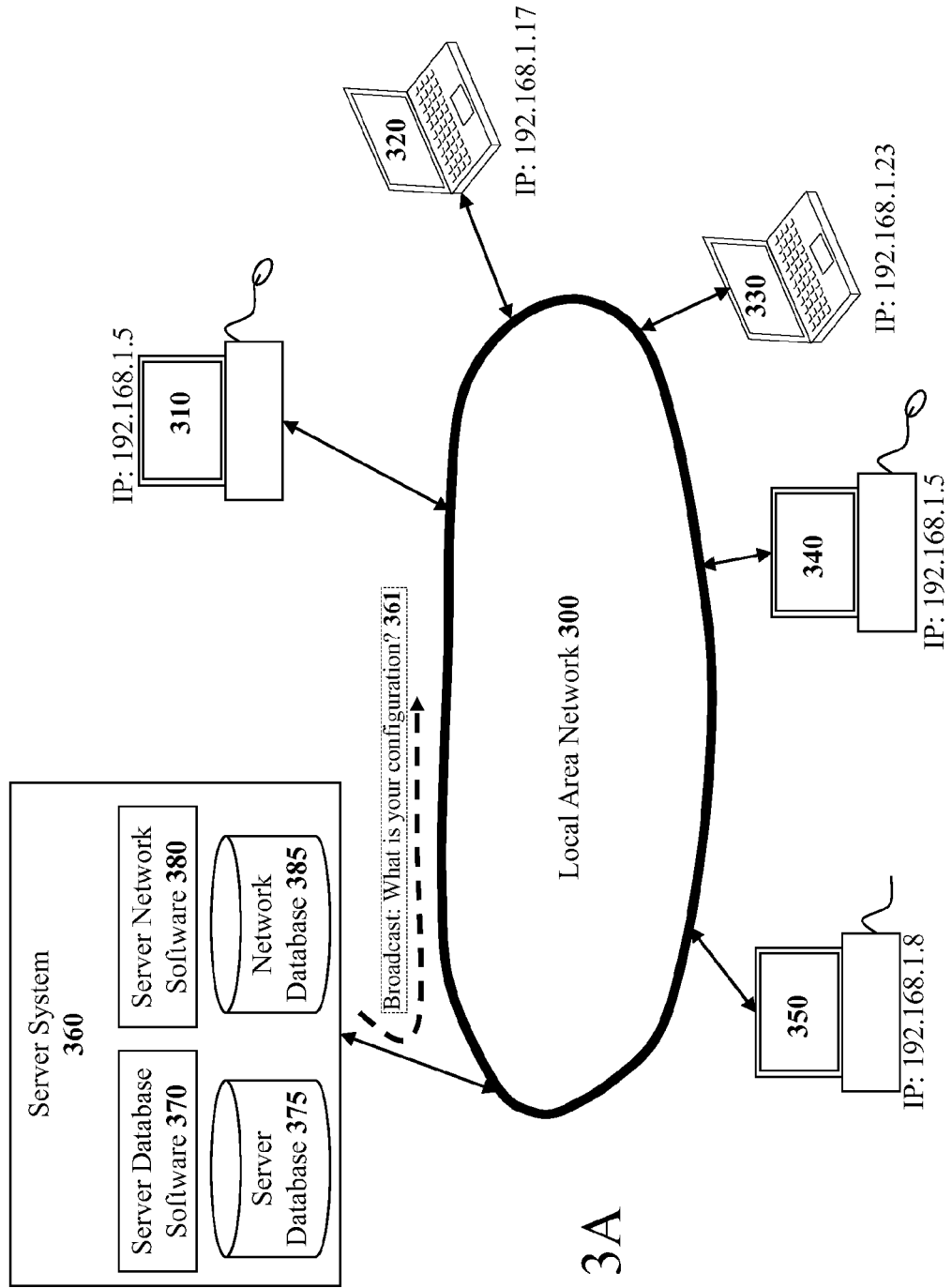
FIG. 3A illustrates a block diagram of the computer network system of FIG. 1 wherein server network software has been added, in accordance with an example embodiment.
Figure 3B:
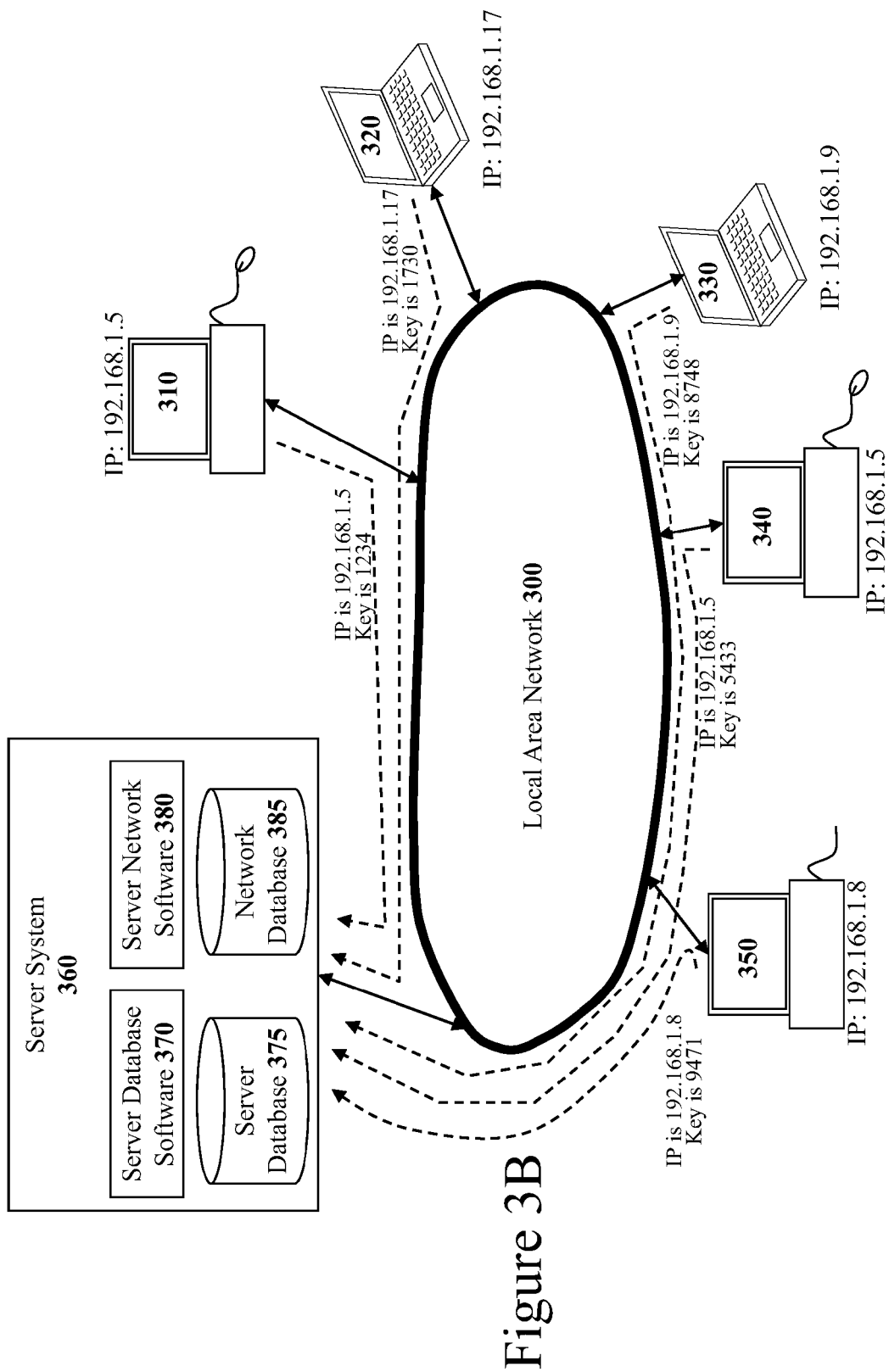
FIG. 3B illustrates a block diagram of the computer network system of FIG. 3A wherein clients respond to a broadcast request with configuration information, in accordance with an example embodiment.
Figure 3C:
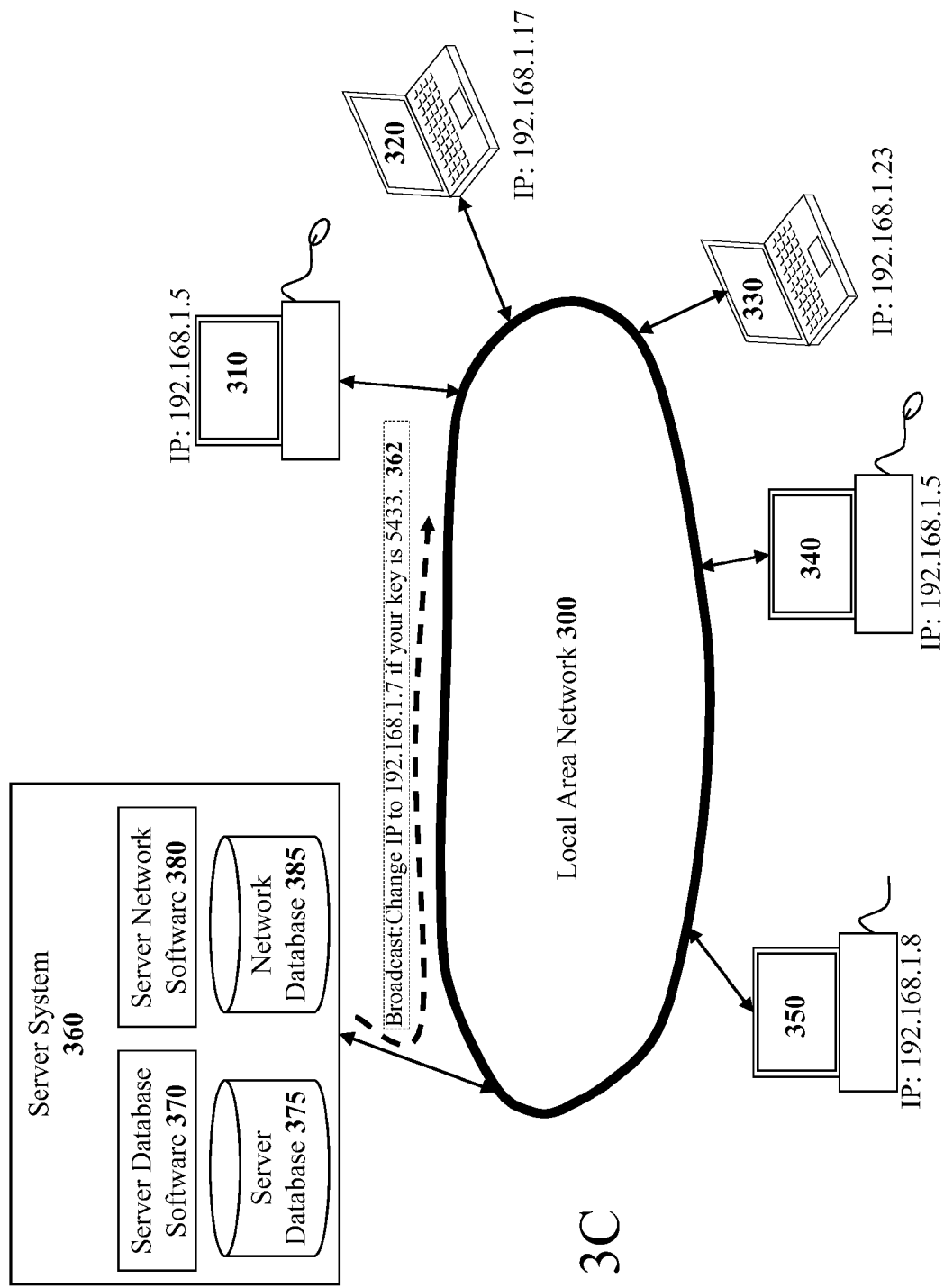
FIG. 3C illustrates a block diagram of the computer network system of FIG. 3B wherein a server issues a request to a client to properly configure that client, in accordance with an example embodiment.
Figure 3D:
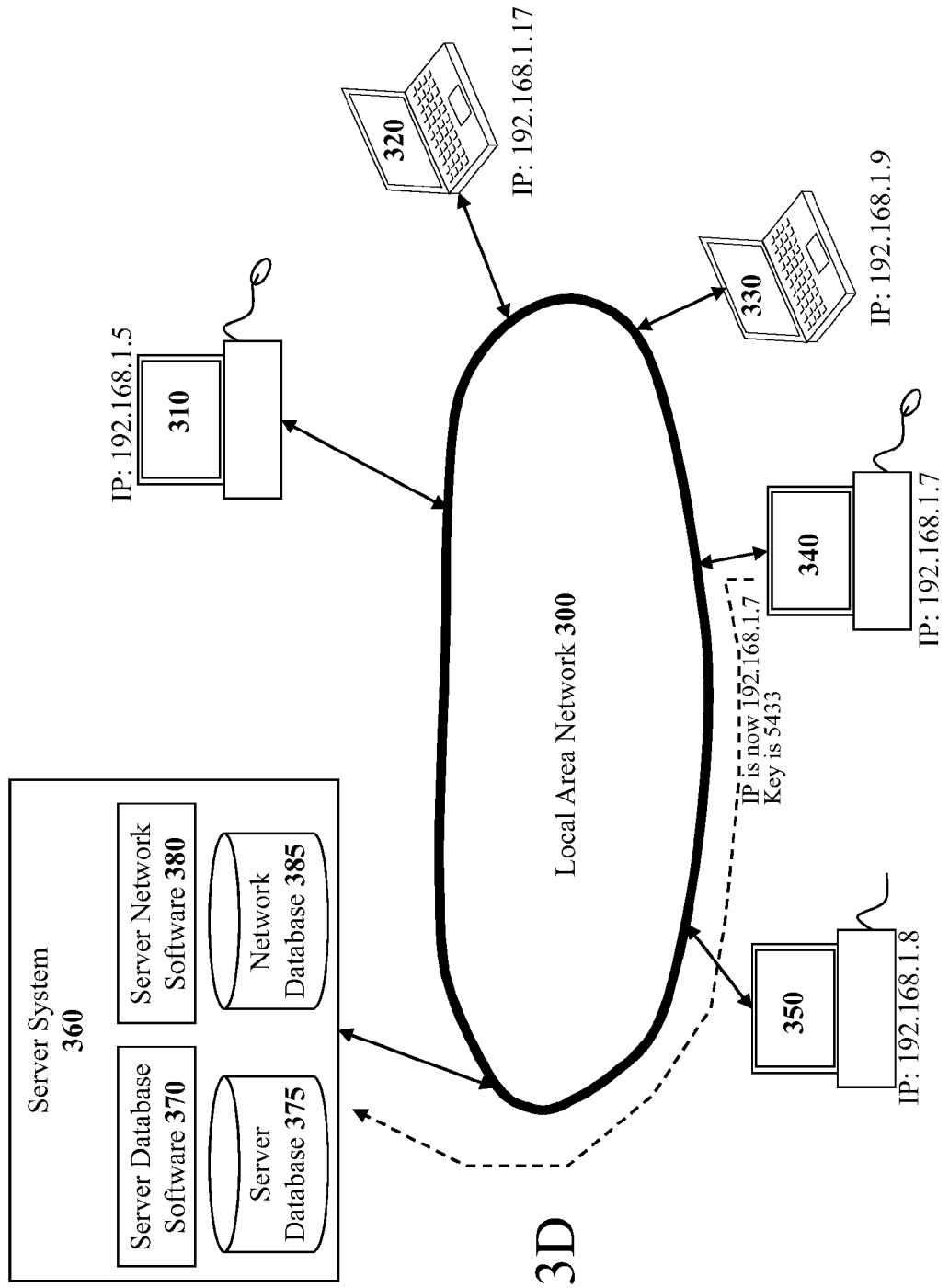
FIG. 3D illustrates a block diagram of the computer network system of FIG. 3C wherein the reconfigured client acknowledges the reconfiguration, in accordance with an example embodiment.
Figure 4:
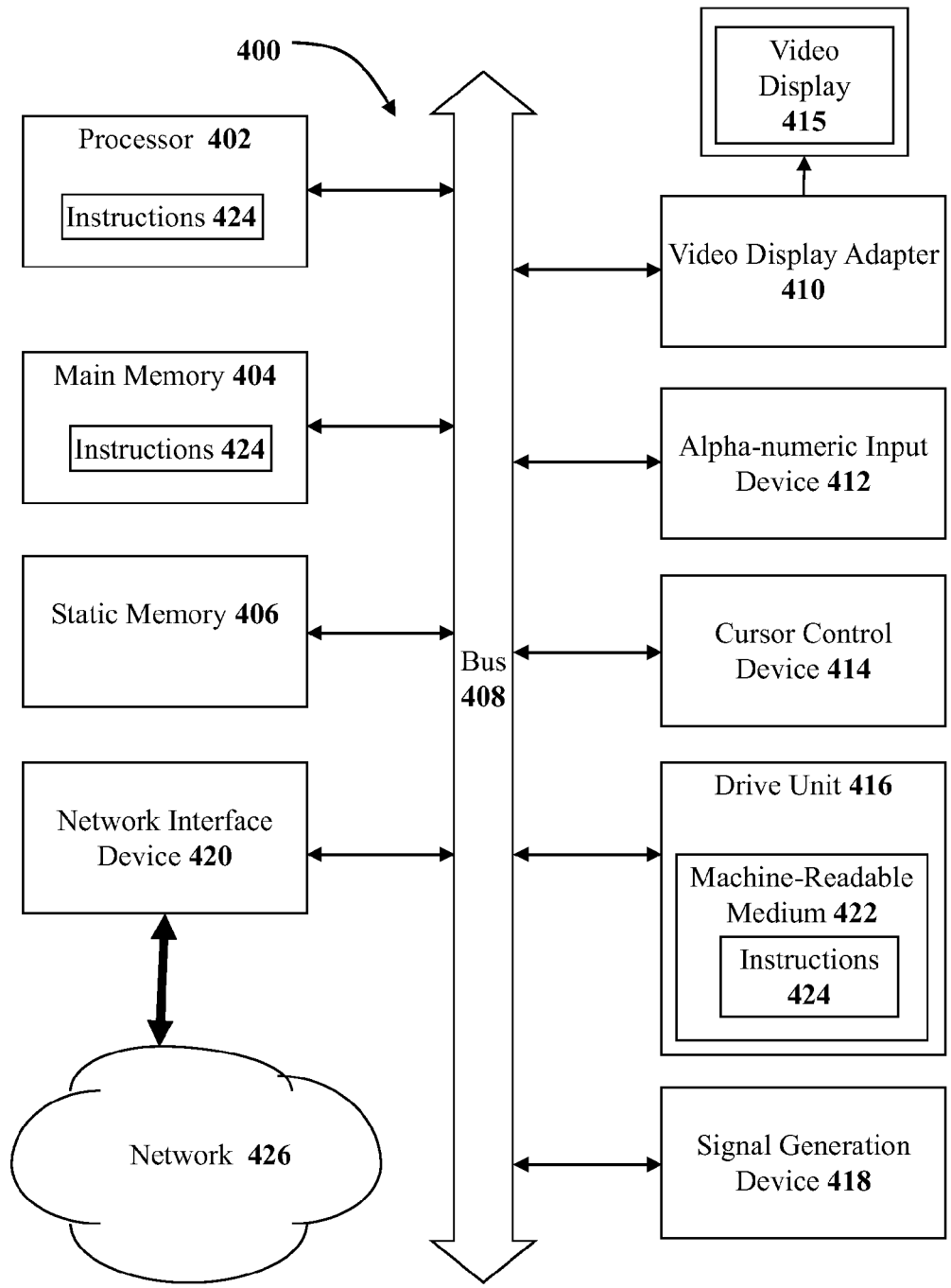
FIG. 4 illustrates a diagrammatic representation of machine in the example form of a computer system within which a set of instructions, for causing the machine to perform any one or more of the methodologies discussed herein, may be executed.

An example of the system of the present disclosure will be presented with reference to FIGS. 2 through 4. FIG. 2 illustrates a flow diagram of one embodiment of a method used by the present disclosure. FIG. 3A illustrates the network system of FIG. 1 with an IP address misconfiguration but with the addition of server network software 380 and network database 385 to the server system 360 on the computer network 300. Each of the network nodes (including server system 360) on computer network 300 may comprise a computer system as illustrated in FIG. 4.

FIG. 4 shows a diagrammatic representation of machine in the example form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display adapter 410 coupled to a video display system (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored one or more sets of computer instructions and data structures (e.g., instructions 424 also known as 'software') embodying or utilized by any one or more of the methodologies or functions described herein. The instructions 424 may also reside, completely or at least partially, within the main memory 404 and/or within the processor 402 during execution thereof by the computer system 400, the main memory 404 and the processor 402 also constituting machine-readable media.

The instructions 424 may further be transmitted or received over a network 426 via the network interface device 420 utilizing any one of a number of well-known transfer protocols (e.g., FTP).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

Referring back to the flow diagram of FIG. 2, the server system first sends a broadcast message out to the other network nodes on the computer network to learn configuration of each other network nodes on the local network at step 210. This is illustrated in FIG. 3A as a "Broadcast: What is your configuration?" message 361 sent by server system 360. This broadcast message 361 should be received and processed by all the other nodes on the computer network. In one embodiment, a User Datagram Protocol (UDP) broadcast message is used for this broadcast message 361.

Next, at step 220, network software within each other network node (not shown) responds to the broadcast message 361 with a response containing configuration information and an identifier key value. In one embodiment, the identifier key value may be a randomly generated number. This step is illustrated in FIG. 3B wherein each of the other network nodes respond to the broadcast message from the server system 360 with their current network configuration and their individual identifier key value. In the example embodiment illustrated in FIG. 3B, each network node responds with the assigned IP address as the network node's network configuration. However, other network configuration information such as MAC addresses, subnet masks, DNS server addresses, gateway addresses, and other network configuration information may be provided as well.

At step 230, the server system 360 then builds a table of network nodes in network database 385 using the information received in the response messages sent in response to the broadcast message 361. If the server system 360 has already built a table of network nodes, then the server system 360 may simply adjust an existing table using the information received in the responses to the broadcast message. The following table contains the information from the responses illustrated in FIG. 3B.

TABLE 1

| Device | IP address | Identifier key value |
| --- | --- | --- |
| Device 310 | 192.168.1.5 | 1234 |
| Device 320 | 192.168.1.17 | 1730 |
| Device 330 | 192.168.1.9 | 8748 |
| Device 340 | 192.168.1.5 | 5433 |
| Device 350 | 192.168.1.8 | 9471 |

With the information of Table 1, server system 360 can now uniquely address any network node that has responded to the broadcast request by using a combination of the IP address and the identifier key value. Thus, even though network device 310 and network device 350 have the same IP address of 192.168.1.5, a message may be sent to IP address 192.168.1.5 along with the identifier key value to distinguish between those two devices. Each device will examine the identifier key value in a message before fully processing the message, if a received message does not have a matching identifier key value then network device will discard the message without further processing.

In some embodiments, the server system 360 may perform a further step of correcting any configuration errors that have been identified. For example, step 240 specifies that the server system may request network nodes with a duplicate address to change a duplicate network address. This is illustrated in FIG. 3C wherein a server system 360 broadcasts a "Change your IP address to 192.168.1.7 if your identifier key value is 5433" message 362. Since network device 340 has identifier key value 5433, network device 340 will change its IP address accordingly and may send out an acknowledgement message as illustrated in FIG. 3D such that server system 360 can update its network table in network database 385. The updated network table for this example may appear as follows:

TABLE 2

| Device | IP address | Identifier key value |
| --- | --- | --- |
| Device 310 | 192.168.1.5 | 1234 |
| Device 320 | 192.168.1.17 | 1730 |
| Device 330 | 192.168.1.9 | 8748 |
| Device 340 | 192.168.1.7 | 5433 |
| Device 350 | 192.168.1.8 | 9471 |

Note that step 240 is an optional step. In some systems, the software within the network nodes may not have adequate permission or access to make needed network configuration changes such as changing the IP address (or MAC address). In such network systems, server system 360 will just use the information in the network table to distinguish between the various network devices with the same IP addresses (or MAC addresses).

Referring back to the flow diagram of FIG. 2, the server system determines if it is time yet for a periodic re-test at step 250. If it is not yet time for a periodic re-test, then nothing occurs. When it is time for a periodic re-test of the network configuration, the system returns to step 210 to send out a new broadcast message querying the network configuration of each node on the computer network. The system will then proceed through the same steps to adjust the network table as necessary. In this manner, if a new network node was added to the computer network with the same IP address of an existing network node, that new network node will be discovered during the periodic re-test.

The preceding example concerned an IP address misconfiguration. However, one skilled in the art would recognize that the same principles apply to a MAC address misconfiguration. Specifically, the same set of steps in FIG. 2 would be applied except that the system would test for (and rectify if possible) duplicate MAC addresses.

An Example Application

Figure 5:
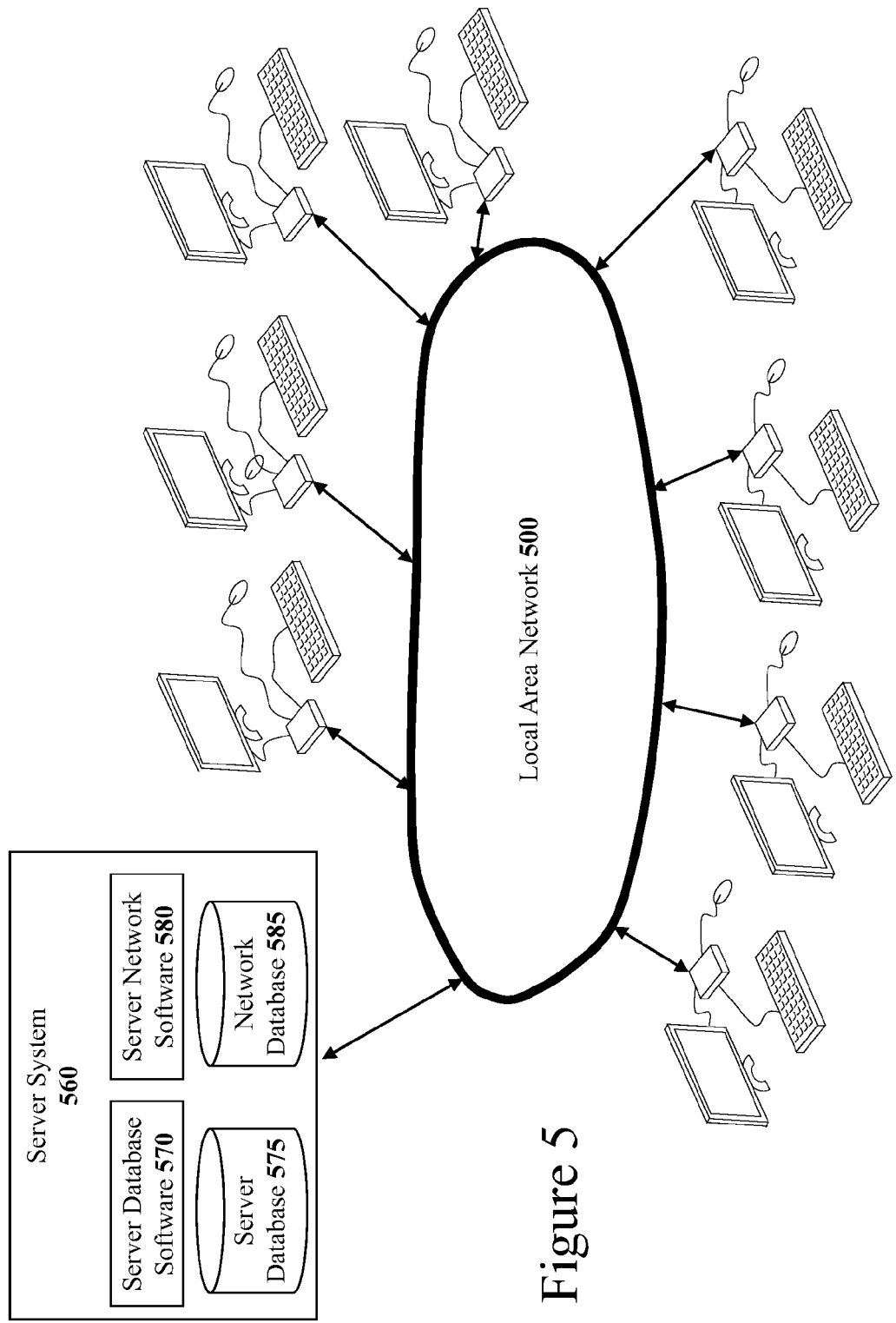
FIG. 5 illustrates a block diagram of a computer network system with a server system and a set of thin client network nodes.

To reduce the complexity and costs of computer system deployments, server-based thin-client systems have become popular. FIG. 5 illustrates an example deployment of a server-based thin-client network environment. Server-based thin-client systems give each individual user a network connected thin-client system with its own display, keyboard, and cursor control device as illustrated in FIG. 5. However, the thin-client device itself is not a full-fledged computer system. The thin-client system obtains its computing resources from the server computer system 560 coupled to the network.

The network administrators of low cost server-based thin-client system deployments such as the one illustrated in FIG. 5 are often part-time or not highly-trained personnel. Thus, it would be ideal to make such low cost server-based thin-client systems as simple to deploy and maintain as possible. Since the teachings of the present invention greatly simplify the deployment and administration of a low cost server-based thin-client system, the present invention is ideal for such server-based thin client systems. Furthermore, the cost for technical support of such server-based thin-client systems will be greatly reduced due to the robustness of the system.

The preceding description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A method of configuring a computer network, the method comprising:
    broadcasting a configuration request message from a server system to a plurality of network nodes connected to a computer network;
    receiving configuration response messages from at least one network node of the plurality of network nodes connected to the computer network, the configuration response messages each including an identifier key value;

constructing a network table in the server system, the network table comprising a list of network nodes that have sent configuration response messages and the identifier key values included in the configuration response messages;

communicating to an individual network node connected to the computer network using a message associated with a combination of the identifier key value of the individual network node and an Internet Protocol address assigned to the individual network node; and transmitting a change address request message from the server system to a first network node having a duplicate address, the change address request message having a first identifier key value associated with the first network node.

2. The method of claim 1, wherein the configuration response messages from each of the at least one network node further include a network configuration of the network node.

3. The method of claim 1, wherein the duplicate address comprises an Internet Protocol (IP) address.

4. The method of claim 1, wherein the duplicate address comprises an Media Access Control (MAC) address.

5. The method of claim 1, wherein the plurality of network nodes comprises thin-client systems.

6. The method of claim 1, wherein the identifier key value comprises a random value.

7. The method of claim 1, further comprising periodically repeating the broadcasting of the configuration request message, the receiving of the configuration response messages, and the constructing of the network table in the server system.

8. A computer network system, comprising:
a computer network;
a plurality of network nodes connected to the computer network, the network nodes each having an identifier key value; and
a server system, the server system comprising:
a network table comprising a list of network nodes on the computer network; and
a network configuration module configured to:
broadcast a configuration request message to the plurality of network nodes,
receive configuration response messages including an associated identifier key value from at least one network node of the plurality of network nodes, and
populate the network table comprising the list of network nodes with identifier key values received from each of the at least one network node,
the server system communicating to an individual network node connected to the computer network using a message associated with a combination of the identifier key value of the individual network node and an Internet Protocol address assigned to the individual network node, wherein the server system transmits a change address request message to a first network node having a duplicate address and a first identifier key value associated with the first network node.

9. The computer network system of claim 8, wherein configuration response messages from each of the at least one network node further include a network configuration of the network node.

10. The computer network system of claim 8, wherein the duplicate address comprises an Internet Protocol (IP) address.

11. The computer network system of claim 8, wherein the duplicate address comprises an Media Access Control (MAC) address.

12. The computer network system of claim 8, wherein the network nodes comprise thin-client systems.

13. The computer network system of claim 8, the method further comprising:
periodically repeating the broadcasting of the configuration request message, the receiving of the configuration response messages, and the constructing of the network table in the server system.

14. A non-transitory computer-readable medium comprising a set of instructions that, when executed by at least one processor, causes the at least one processor to perform operations, comprising:
broadcasting a configuration request message from a server system to a plurality of network nodes connected to a computer network;
receiving configuration response messages from at least one network node of the plurality of network nodes connected to the computer network, the configuration response messages each including an identifier key value;
constructing a network table in the server system, the network table comprising a list of network nodes that have sent configuration response messages and the identifier key values included in the configuration response messages;
communicating to an individual network node connected to the computer network using a message associated with a combination of the identifier key value of the individual network node and an Internet Protocol address assigned to the individual network node; and
transmitting a change address request message from the server system to a first network node having a duplicate address, the change address request message having a first identifier key value associated with said first network node.

15. The non-transitory computer-readable medium of claim 14, wherein the configuration response messages from each of the at least one network node further include a network configuration of the network node.

16. The non-transitory computer-readable medium of claim 14, wherein the duplicate address comprises an Internet Protocol (IP) address.

17. The non-transitory computer-readable medium of claim 14, wherein the duplicate address comprises a Media Access Control (MAC) address.

18. The non-transitory computer-readable medium of claim 14, wherein the plurality of network nodes comprises thin-client systems.

19. The non-transitory computer-readable medium of claim 14, wherein the identifier key value comprises a random value.

20. The non-transitory computer-readable medium of claim 14, further comprising periodically repeating the broadcasting of the configuration request message, the receiving of the configuration response messages, and the constructing of the network table in the server system.

* * * * *